United States Patent [19]

Pastor et al.

[11] 4,097,417

[45] Jun. 27, 1978

[54] PHOTOCURABLE ELECTROCONDUCTIVE COATING COMPOSITION

[75] Inventors: Stephen D. Pastor, Edison; Martin M. Skoultchi, Somerset; Henry R. Hernandez, Somerville, all of N.J.

[73] Assignee: National Starch and Chemical Corporation, Bridgewater, N.J.

[21] Appl. No.: 466,264

[22] Filed: May 2, 1974

[51] Int. Cl.$^2$ .............. H01L 13/00; C08F 8/00; C08F 2/46

[52] U.S. Cl. ................. 252/501; 96/1.5 R; 96/1.6; 96/1.8; 96/115 R; 96/115 P; 204/159.15; 204/159.16; 204/159.23; 252/500; 252/518; 260/79.3 MU; 427/44; 427/54; 428/431; 428/458; 428/461; 428/462; 428/463; 428/492; 428/500; 428/507; 526/291; 526/317; 526/328

[58] Field of Search ............ 204/159.16, 159.23; 96/1.6, 1.5; 427/44, 54; 260/837, 79.3 MU; 252/501; 526/291, 317, 328

[56] References Cited

U.S. PATENT DOCUMENTS

| | | | |
|---|---|---|---|
| 2,593,787 | 4/1952 | Parker | 260/865 |
| 3,552,986 | 1/1971 | Bassemir et al. | 427/54 |
| 3,669,716 | 6/1972 | Keyl et al. | 427/54 |
| 3,881,925 | 5/1975 | Uchida et al. | 96/1.8 |
| 3,912,693 | 10/1975 | Shimizu et al. | 204/159.23 |
| 3,919,063 | 11/1975 | Maruyama et al. | 204/159.15 |
| 3,922,464 | 11/1975 | Silver et al. | 427/207 B |
| 3,932,181 | 1/1976 | Ray-Chaudhuri et al. | 96/1.5 |
| 3,933,875 | 1/1976 | Brose et al. | 428/413 |

FOREIGN PATENT DOCUMENTS 2,116,001 7/1972 France.

*Primary Examiner*—Murray Tillman
*Assistant Examiner*—Thurman K. Page
*Attorney, Agent, or Firm*—James & Franklin

[57] ABSTRACT

A photocurable electroconductive coating composition adapted to be crosslinked and insolubilized by actinic radiation comprises an acrylic monomer, a photoactivatable free radical polymerization initiator and a salt of a copolymerizable organic compound, wherein at least one of the monomers contains more than one polymerizable ethylenically unsaturated group. The cured coatings are insoluble in aqueous and organic solvents and are conductors of electricity suitable for conductive underlayers of photoconductive imaging elements and as antistatic coatings.

11 Claims, No Drawings

PHOTOCURABLE ELECTROCONDUCTIVE COATING COMPOSITION

BACKGROUND OF THE INVENTION

This invention relates to photocurable coating compositions. More particularly it relates to photocurable coating compositions which are capable of being insolubilized and crosslinked by exposure to actinic radiation and which are relatively good conductors of electricity.

In preparing an element suitable for electrostatic imaging, a support such as paper or plastic film is coated successively with an electroconductive layer and a photoconductive layer which ordinarily comprises a photoconductive pigment such as zinc oxide in a suitable electrically insulating binder. Since it is important that the photoconductive layer be electrically insulating in the absence of light, it is important to prevent any of the electrically conductive material from the electroconductive layer from becoming incorporated into the photoconductive layer. When both the electrically conductive layer and the photoconductive layer are coated from the same type of solvent, it is difficult to prevent the solvent for the photoconductive layer from dissolving a small amount of the previously deposited electroconductive layer and incorporating it in the photoconductive layer with accompanying detrimental effect. Furthermore, solvent coating procedures require application of heat to volatilize the solvent and, in the case of organic solvents, require special handling for flammable and/or toxic solvents.

SUMMARY OF THE INVENTION

It is an object of this invention to prepare an electroconductive coating composition which does not require the use of solvents for coating. It is a further object to prepare such a composition which can be cured by exposure to actinic radiation.

The photocurable electroconductive coating composition of this invention essentially comprises
 (A) An acrylic monomer, devoid of groups which inhibit free radical polymerization, having at least one terminal acrylate or substituted acrylate group,
 (B) A photoactivatable free radical polymerization initiator, said initiator being present as a separate species or in chemical combination with said monomer, and
 (C) A copolymerizable monomer which is a salt of an ionic organic compound having at least one terminal ethylenically unsaturated group,
wherein at least one of said monomers in part A or part C contains more than one terminal ethylenically unsaturated group.

The compositions may be coated on any suitable substrate such as paper or plastic film by any conventional coating technique. The coated composition is then cured by exposure to actinic radiation. The cured coating is a relatively good conductor of electricity, suitable for the underlayer of electrostatic imaging elements, and is insoluble in aqueous and organic solvents.

DESCRIPTION OF THE PREFERRED EMBODIMENTS

The acrylic monomer used as component A of the compositions of this invention may be any chemical species having a terminal acrylate group. Terminal acrylate group signifies one which is not bound in the center of a chain of monomers, but rather has its ethylenically unsaturated group either isolated at one end of a molecule or at least at the end of a branch if it is incorporated in a large polymeric molecule. Preferred acrylic monomers are acrylic acid and substituted acrylic acids such as methacrylic acid and crotonic acid; acrylate esters such as alkyl acrylates having between 1 and 20 carbon atoms in the alkyl group; hydroxyalkyl acrylate and methacrylate esters having between 2 and 20 carbon atoms in the alkyl group, for example, hydroxypropyl acrylate and hydroxybutyl methacrylate; esters of acrylic acid or substituted acrylic acids with polyhydroxy compounds such as the diesters of acrylic acid with alkylene glycols having 2 to 20 carbon atoms in the alkylene portion of the molecule; diesters of acrylic acid with polymethylene glycols and polyalkylene glycols; and the tri- and tetra- esters of acrylic acid with pentaerythritol.

Also included among the preferred acrylic monomers are relatively low molecular weight polyesters containing terminal acrylate or substituted acrylate groups. Such prepolymers are formed by reacting an hydroxyalkyl ester of acrylic acid with a cyclic anhydride of a dicarboxylic acid such as succinic anhydride, maleic anhydride, phthalic anhydride, tetrahydrophthalic anhydride, and the like under conditions leading to formation of relatively low molecular weight polyesters. Compounds having an epoxy group such as epichlorohydrin, 1,2-epoxybutane, propylene oxide, glycidyl acrylate, glycidyl methacrylate, and the like may be included in the polyester.

The low molecular weight polyesters which may be used as the acrylic monomer component may have a single terminal acrylic ester group or more than one such group. If the polyester incorporates glycidyl acrylic ester monomers as well as hydroxyalkyl acrylates, the polyester will have more than one terminal acrylic group.

Preferred photoactivatable free radical polymerization initators are ($C_1$-$C_4$) alkyl benzoin ethers, e.g., methyl benzoin ether, butyl benzoin ether, isobutyl benzoin ether, etc., 3-hydroxy-2-butanone, phenanthrenequinone, the polyhalogenated aromatic compounds, e.g., tetrachlorophthalic anhydride, tetrabromophthalic anhydride, and 1,4,5,6,7,7-hexachloro-5-norbornene-2,3-dicarboxylic anhydride and those symmetrically substituted benzoins having structures represented by the following general formula:

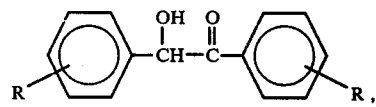

wherein R is hydrogen or halogen or an alkyl group containing from 1 to 20 carbon atoms.

When it is desired that the photoactivatable free radical polymerization initiator be chemically combined with the acrylic monomer, an initiator having a group capable of entering into an esterification reaction is used. This initiator is incorporated into the low molecular weight polyester which is to be used as the acrylic monomer portion of the composition by including it among the compounds which are reacted to form the polyester. Since it is an esterifiable compound it combines with the other ingredients of the polyester and is thus incorporated in the polyester molecule. Preferred initiators of this type are the polyhalogenated anhydrides of dicarboxylic acids such as tetrachlorophthalic anhydride, tetrabromophthallic anhydride, and 1,4,5,6,7,7-hexachloro-5-norbornene-2,3-dicarboxylic anhydride; and the half esters of dicarboxylic acids with the symmetrically substituted benzoins mentioned above, such as the half ester of maleic acid with benzoin.

The copolymerizable monomer which is a salt of an ionic organic compound may be a salt of an unsaturated acid such as acrylic and substituted acrylic acids or a salt of an unsaturated organic base such as an allyl substituted quaternary ammonium compound. Preferred unsaturated acid salts are alkali metal salts of acrylic and methacrylic acid and of vinylbenzene sulfonic acid. Preferred salts of an unsaturated organic base are N,N,N-trimethyl-N-(3-methacryloxy-2-hydroxy-propyl)-ammonium chloride; N,N-dimethyl-N,N-diallyl ammonium chloride; N,N,N-triallyl-N-methyl ammonium chloride; N,N-dimethyl-N-allyl-N-(2-methacryloxyethyl)-ammonium chloride; 1,4-bis(N,N-dimethyl-N-methacryloxyethyl-ammonium chloride)-butene-2; and tetraallyl ammonium chloride.

The preferred proportions of the ingredients of the photocurable composition of this invention are as follows. The acrylic monomer preferably makes up about 50 to about 80 percent, by weight of the composition, the photoactivatable initiator preferably makes up 1.0 to 10 percent, by weight, and the copolymerizable monomer salt preferably makes up 20 to 50 percent of the composition.

If desired, conventional non-chemically functional additives may be incorporated into the novel photocurable coating compositions of this invention in order to modify the properties thereof. Among these additives may be included: organic solvents such as acetone or methylethyl ketone; fillers such as finely ground polymer resins; free-radical polymerization inhibitors such as p-methoxyphenol and the like; pigments such as titanium dioxide, barium, sulphate, clay, etc.; and ultraviolet light transparent dyes such as Brilliant Violet B, Fast Red 8 BLX, etc.

The photocurable coating compositions may be applied to the substrate by means of any conventional coating technique. Any mechanical coating process such as air knife, trailing blade, knife coater, reverse roll, or gravure coating is satisfactory. The photocurable compositions of this invention may usually be coated at the temperatures at which they are prepared or at room temperature. The coating weights at which they are applied will vary according to the particular composition utilized, the selected substrate, and the specific end-product contemplated.

Our photocurable compositions may be coated onto a virtually unlimited variety of substrates, including, for example, paper, cloth, paperboard, metal sheets and foils, glass, fiber glass, foamed plastics, rubber, cellophane, wood and plastic films and sheets, such as those derived from polyethylene terephthalate, polystyrene, rubber hydrochloride, polyvinyl chloride, polyvinylidene chloride, and any substrate which can adhere to the coated film.

In order to cure the photopolymerizable coating compositions of this invention, it is merely necessary to expose the coated film to an actinic radiation source, i.e. to radiation having a wavelength no longer than 4000 Å, for a period of time which is sufficient to accomplish the desired amount of free-radical polymerization and, if a polyethylenically unsaturated comonomer is present, crosslinking. In addition to ultraviolet light, the useful sources of actinic radiation include, inter alia, those of the high energy bombardment classes, e.g. nuclear particles, energetic electrons such as those derived from isotopes or intense electron beams, x-rays, the ionizing radiation particles such as protons, neutrons, alpha and gamma rays, etc. Obviously, since the source of radiation and the length of exposure, as well as the distance between the source and the coated film, will depend on the particular composition and film thickness, the selection of the most suitable means of exposure is left to the practitioner.

The following examples will further illustrate the embodiments of our invention. It should be noted that all concentrations are given in terms of grams, unless otherwise specified.

EXAMPLE I

This example illustrates the preparation of an electroconductive coating, in accordance with this invention, using a mono-functional monomer and an alkyl benzoin ether photoinitiator in combination with a polyfunctional electroconductive quaternary salt. This example also illustrates the usefulness of said electroconductive coating in an electroconductive system.

The radiation curable composition was prepared by thoroughly mixing 0.2 parts of benzoin methyl ether with 1.3 parts of acrylic acid and 2.5 parts of 1,4-bis(N,N-dimethyl-N-methacryloxyethyl ammonium chloride) butene-2 in a suitable beaker. The first two compounds were of the respective commercially available types, and the latter was synthesized in the following manner.

Into a one liter flask shielded from light, equipped with a mechanical stirrer, and containing 15 grams (0.0955 moles) of N,N-dimethylaminoethyl methacrylate, 25 milliliters of isopropyl alcohol, and 0.5 grams of hydroquinone there were added 6 grams (0.048 moles) of 1,4-dichlorobutene-2 over a 90 minute period. This mixture was stirred at about 23° C for 48 hours, and the resultant mix was poured into a beaker containing 1000 milliliters of a 1:1 mixture of acetone and hexane. The crystals of 1,4-bis-(N,N-dimethyl-N-methaloxyethyl ammonium chloride) butene-2 which formed therein were filtered and dried. The structure of the dried product was confirmed, spectroscopically, by nuclear magnetic resonance (NMR) and infrared absorption (IR), and the yield of this product based on the calculated theoretical amount was between 91 and 99 percent.

The above composition was coated onto paper, using a #3 wire wound rod, and then cured by continuously exposing it over a period of 90 seconds to the light from a commercially available ultraviolet lamp. This cured coating was then overcoated with an aqueous zinc oxide suspension which was prepared as follows:

Five grams of a vinyl acetate and crotonic acid copolymer (90/10) were slowly mixed with 0.4 grams of ammonium hydroxide and 194.6 grams of distilled water and stirred until a solution was obtained. Then 128.0 grams of this solution were mixed with 80.0 grams of zinc oxide. Thereafter 180.0 grams of the latter dispersion were mixed with 11.0 grams of a partially neutralized acid, vinyl acetate and acrylic interpolymeric binder and a small amount of a commercially available dye sensitizer.

When employed, along with a suitable original copy, in a commercially available electrostatic printing machine, the above described electroconductive paper yielded a copy of the original and displayed the characteristics normally expected of such products.

EXAMPLE II

This example further illustrates the preparation of an electroconductive printing sheet, using an electroconductive coating comprising a mono-functional monomer and an alkyl benzoin ether photoinitiator in combination with a polyfunctional electroconductive quaternary salt, in accordance with this invention.

In this case, the actinic radiation curable composition was prepared by thoroughly mixing 0.2 parts of methyl benzoin ether with 1.3 parts of acrylic acid and 2.5 parts of N,N,N-triallyl-N-methylammonium chloride.

The above described composition was coated onto a paper substrate, cured, and overcoated with an aqueous zinc oxide dispersion in the manner respectively set forth in Example I. When the resultant electrostatic copying paper was utilized in an electrostatic copying operation as described in Example I, a legible copy of the same original, which was comparable to that in Example I, was obtained.

EXAMPLE III

This example still further illustrates the usefulness of an electroconductive coating comprising a monofunctional monomer and an alkyl benzoin ether photoinitiator in combination with a polyfunctional electroconductive salt, in accordance with this invention, in the preparation of an electrostatic printing sheet.

The procedural steps of the sequence outlined in Example I were repeated, except the coating herein comprised 2.3 parts of 2-hydroxyethyl acrylate and 0.5 parts of isobutylbenzoin ether in combination with 2.3 parts of N,N,N-triallyl-N methyl-ammonium chloride.

When the electroconductive paper bearing the cured coating overcoated with the aqueous zinc oxide dispersion was subsequently utilized in a conventional electrostatic printing machine, the results were comparable to those of the preceding examples.

EXAMPLE IV

This example illustrates the ability of an actinic radiation curable electroconductive coating composition of this invention to decrease the surface resistivity, i.e., to increase the surface conductivity, of the substrate.

The conductivity reciprocal measurements of the Surface Electrical Resistance (SER) of four paper based samples and a non-coated control were made by means of a commercially available resistance box. Each sample was coated to a varied coating weight with a composition having the same formulation as that of the test coating in Example II, using a wire would rod. All exposures were made by means of ultraviolet light. All measurements were made at a relative humidity level of 11% and a temperature of 23° C. The respective coating weights and corresponding SER results are presented below.

| Sample | Coating Weight (lbs./3000 ft.$^2$) | SER (ohms) |
| --- | --- | --- |
| A | 2.1 | $8.8 \times 10^{12}$ |
| B | 2.4 | $3.3 \times 10^{12}$ |
| C | 3.4 | $8.4 \times 10^{11}$ |
| D | 4.8 | $2.2 \times 10^{11}$ |
| Control | — | $2.4 \times 10^{16}$ |

As indicated by the data summarized above, an increase in surface conductivity, reflected by the decrease in surface resistivity, was realized only in the samples wherein the electroconductive coating had been applied.

EXAMPLE V

This example illustrates the usefulness of a polyfunctional monomer and an alkyl benzoin ether in combination with a polyfunctional electroconductive composition in accordance with this invention. Said polyfunctional monomer was prepared as set forth below.

Into a suitable flask mounted on a water bath, equipped with a mechanical stirrer, and protected from light were introduced 1 mole of 2,3-dibromopropanol, 2 moles of maleic anhydride, 1 mole of glycidyl methacrylate 0.5% benzyl trimethyl ammonium chloride and 0.1% p-methoxyphenol based on the weight of components. These ingredients were continually stirred at 70° C until the reaction was completed, as indicated by an acid number of 0.7. Thereafter 17 parts of the product of the reaction were thoroughly admixed with 15 parts of N,N,N-triallyl-N-methyl ammonium chloride and 1.7 parts of isobutyl benzoin ether to form a composition which, upon being coated onto a paper substrate and then cured by means of ultraviolet light, displayed all of the desired characteristics normally expected of electrostatic copying paper.

EXAMPLE VI

This example, in addition to further illustrating the usefulness of a polyfunctional monomer and a polyfunctional electroconductive salt in combination with an alkyl benzoin ether photoinitiator, shows the effectiveness of a prepolymer and a non-chemically bonded photoinitiator in the preparation of a photocurable electroconductive coating composition in accordance with this invention.

In this case, the polyfunctional prepolymer was prepared by reacting 1 mole of commercially available poly(propylene ether) glycol having a hydroxyl number of 26.07 with 0.01 percent water with 2 moles of toluene disocyanate at 70° C until the theoretically expected value, as determined by standard isocyanate analysis, was obtained and then reacting the product thereof with 2 moles of hydroxyethyl acrylate in the presence of a small amount of a tin octoate catalyst until the NCO value was determined to be zero.

Thereafter, 11.0 parts of the thusly prepared poly(propylene ether) diacrylate and 1.1 parts of isobutyl benzoin ether were thoroughly admixed with 10 parts of N,N,N,-triallyl-N methyl ammonium chloride to form a composition which, when coated onto a paper substrate and exposed to ultraviolet light, exhibited the desired electroconductive properties.

EXAMPLE VII

This example illustrates the usefulness of a polymerizable mono-functional composition having a chemically bonded photoinitiator activatable by actinic radiation therein and a copolymerizable polyfunctional electroconductive salt in the preparation of an electroconductive coating composition in accordance with this invention. The aforementioned polymerizable composition was prepared as set forth below.

Into a suitable flask mounted on a water bath, equipped with a mechanical stirrer, and protected from light were introduced 1 mole each of maleic anhydride and benzoin. These ingredients were continually stirred at 130° C until the reaction was completed, as indicated by an acid number of 181. One mole of glycidyl methylacrylate was then added and reacted at 70° C to an acid number of 0.9. Thereafter, 10 parts of the product of the reacted mixture were thoroughly admixed with 10 parts of N,N,N-triallyl-N-methyl ammonium chloride to ultimately form the desired electroconductive composition. This composition, upon being coated onto a paper substrate, cured by ultraviolet light, and subsequently utilized in a commercially available electrostatic copying machine in the manner outlined in Example I, proved useful in the electrostatic printing art.

EXAMPLE VIII

This example further illustrates the usefulness of a polymerizable composition having a chemically bonded photoinitiator activatable by actinic radiation therein and a copolymerizable electroconductive salt in the preparation of an electroconductive coating composition in accordance with this invention. Said polymerizable composition was prepared as follows:

A suitable flask was protected from light, mounted in a water bath, and equipped with a condenser and a mechanical stirrer. Into said flask were introduced the following ingredients:

| Ingredient | Amount (grams) |
| --- | --- |
| 2-hydroxyethyl acrylate | 34.8 |
| Maleic anhydride | 58.8 |
| Glycidyl methacrylate | 128.0 |
| Tetrachlorophthalic anhydride | 85.7 |
| Benzyl trimethyl ammonium chloride (catalyst) | 1.6 |
| p-Methoxyphenol (free-radical inhibitor) | 0.31 |

The above described ingredients were thoroughly stirred, and the temperature of the resulting mixture was raised to and maintained at about 70° C until an acid number of 0.9 was obtained. The thusly prepared composition was cooled to about 23° C and 11.3 grams withdrawn therefrom were thoroughly admixed with 12.0 grams of N,N-dimethyl-N,N-diallyl ammonium chloride and 10.0 grams of methyl-(2-hydroxy-3-methacryloxypropyl)-maleate, thereby forming the desired electroconductive coating composition. This composition, upon being coated onto paper and exposed to actinic radiation for about 1/80 of a second by means of a commercially available, conveyorized ultraviolet lamp at a distance of about 3-4 inches was cured. Furthermore, said composition readily displayed the desired electroconductive properties when subsequently utilized in a commercially available electrostatic copying machine in the manner set forth in Example I.

EXAMPLE IX

This example further illustrates the usefulness of a polyfunctional polymerizable composition having a polyhalogenated aromatic photoinitiator chemically bonded thereto and a copolymerizable electroconductive salt in the preparation of an electroconductive coating composition in accordance with this invention.

Part I: To make the above described polymerizable composition the preparative steps outlined in Example VIII were repeated using the following ingredients in the amounts respectively shown:

| Ingredient | Amount (grams) |
| --- | --- |
| 2-hydroxyethyl acrylate | 34.8 |
| Succinic anhydride | 60.1 |
| Glycidyl acrylate | 128.0 |
| Tetrachlorophthalic anhydride | 85.8 |
| Benzyl trimethyl ammonium chloride | 1.5 |
| p-methoxyphenol | 0.3 |

Part II. Then 20.0 grams of the reaction product obtained by reacting the above ingredients in the aforesaid manner were thoroughly mixed with 10.0 grams of N,N-dimethyl-N,N-diallyl ammonium chloride to ultimately form the desired electroconductive coating composition which was comparable to that prepared in Example VIII.

EXAMPLE X

This example illustrates the usefulness of two separately prepared polyfunctional polymerizable compositions, each having a polyhalogenated aromatic photoinitiator chemically bonded therein, in combination with a copolymerizable electroconductive salt in the preparation of an electroconductive coating composition.

To make the above described actinic radiation curable electroconductive coating composition, 16.5 grams of a polymerizable composition having the same formulation and prepared in the same manner as that utilized in Example IX, and 11.0 grams of N,N-dimethyl-N,N-diallyl ammonium chloride were thoroughly mixed with 10.0 grams of a polymerizable composition prepared by the method set forth in Example VIII hereinabove using the following ingredients:

| Ingredients | Amount (grams) |
| --- | --- |
| 2-hydroxyethyl acrylate | 34.8 |
| Maleic anhydride | 29.4 |
| Tetrachlorophthalic anhydride | 171.5 |
| Glycidyl methacrylate | 128.0 |
| Benzyl trimethyl ammonium chloride | 1.8 |
| p-Methoxyphenol | 0.36 |

A portion of the resultant composition prepared in the above described manner was then coated onto paper and cured by means of ultraviolet light using the methods set forth in Example VIII. The thusly prepared electroconductive element was comparable to those in the preceding examples.

EXAMPLE XI

This example illustrates the correlation between an increase in the coating weight of an electroconductive coating composition prepared in accordance with this invention and increased conductivity, based on the reciprocal Surface Electrical Resistance (SER).

In this case, the electroconductive coating composition comprised 15.0 grams of N,N-dimethyl-N,N-diallyl ammonium chloride, 25 grams of a polymerizable composition having the same formulation as and prepared in the same manner as that utilized in Example VIII, and 10.0 grams of 2-hydroxyethyl acrylate.

A series of five samples, A thru E, were prepared by coating each of five sheets of paper (4 × 4 inches) with the above described electroconductive coating composition to a varied coating weight using a wire wound rod. Then each of the coated surfaces of said samples were cured by means of ultraviolet light in the manner set forth in Example VIII. Thereafter the five cured samples were conditioned by storage at 11% relative humidity for five days and subsequently tested for conductivity based on resistance measurements.

All measurements were made by means of a conventional resistance box at standard voltage level of 500 for SER. The respective coating weights and the corresponding test results for each of the five samples are presented below.

| Sample | Coating Weight (lbs./3000 ft.$^2$) | SER (ohms) |
|---|---|---|
| A | 2.68 | $2.05 \times 10^{13}$ |
| B | 4.92 | $1.15 \times 10^{13}$ |
| C | 5.75 | $6.6 \times 10^{12}$ |
| D | 6.75 | $6.0 \times 10^{12}$ |
| E | 9.55 | $4.3 \times 10^{12}$ |

As indicated by the above data, the increase in conductivity as the coating weight is increased is reflected by the progressive decrease in resistance throughout the series.

EXAMPLE XII

This example illustrates the water insolubility of the actinic radiation curable electroconductive coating compositions prepared in accordance with this invention.

Two test sample electroconductive coating compositions, F and G, were prepared. Each of said samples comprised a polyfunctional polymerizable composition having a polyhalogenated aromatic photoinitiator chemically bonded therein and a hydroxyalkyl ester of an ethylenically unsaturated carboxylic acid in combination with a mono- or difunctional electroconductive salt. The exact formulations of said samples were as follows:

Sample F consisted of 25.0 grams of the polymerizable composition described in Part I of Example VIII, 10.0 grams of 2-hydroxyethyl acrylate, and 15.0 grams of N,N-dimethyl-N,N-diallyl ammonium chloride.

Sample G consisted of 25.0 grams of the polymerizable composition described in Part I of Example VIII, 10.0 grams of 2-hydroxyethyl acrylate, and 15.0 grams of N,N,N,-trimethyl-N-(3-methacryloxy-2-hydroxypropyl)-ammonium chloride, 10 grams of methanol, and 1.0 grams of formamide.

Portions of each of the two above described electroconductive coating compositions were then coated onto separate glass slides by means of a wire wound rod. The coated films having a thickness of about 30 mils were cured by exposure to ultraviolet light from a conventional laboratory ultraviolet lamp for 30 minutes. Thereafter the cured films were peeled from the glass slides to be tested, along with a control electroconductive film, for their water insolubility properties as described herein below. Said control film consisted of a commercially available electroconductive polymer which had been coated onto a glass slide in the above mentioned manner, dried over a period of three hours in an oven set at 260° F, and subsequently peeled from the glass slide.

The water insolubility testing of the above described two sample films, F and G, and the control film was carried out by means of a Soxhlet extractor with distilled water over a three hour period. The test results based on the determined amount of the film composition dissolved, i.e. extracted, compared as follows:

| Sample | Per cent Extracted |
|---|---|
| F | 16.6 |
| G | 1.7 |
| Control | 98.7 |

The data summarized above clearly indicates that the present novel electroconductive coating compositions are by far more water insoluble than the widely commercialized control electroconductive polymer. In fact, it may reasonably be concluded that the cured test sample compositions are, for the most part, water insoluble, particularly in the case of sample G; and that the control composition is practically completely water soluble.

The extreme contrast between the practically water-insoluble sample composition G and the almost totally water-soluble control composition was further evidenced when the conductivities of the water used in the respective extractions described above were compared with each other and the conductivity measurement of the distilled water. The conductivity measurements were made by means of a conventional conductivity bridge and the results obtained therefrom are presented below.

| Sample | Resistance (ohms) |
|---|---|
| Distilled water | 142,000 |
| From Sample G | 3,000 |
| From Control | 412 |

EXAMPLE XIII

This example illustrates the usefulness of an actinic radiation curable electroconductive coating composition as a wash-resistant antistat coating for a fibrous material. This example also illustrates the permanence of the cured composition when utilized in the aforementioned manner. Said coating composition comprised a monofunctional polymerizable compound and an alkyl benzoin ether photoinitiator in combination with a polyfunctional electroconductive quarternary salt.

In this case, the test sample composition was prepared by thoroughly mixing 5 parts of acrylic acid and 1 part of butyl benzoin ether with 5 parts of N,N,N-triallyl-N-methyl ammonium chloride.

Portions of the above described composition were then sprayed onto four pieces of nylon cloth (6 × 6 inches). The dried coatings were then cured by exposure to ultraviolet light of a conventional laboratory ultraviolet lamp from a distance of 12 inches under a nitrogen blanket over a period of about 200 seconds. Thereafter each of the pieces of nylon cloth bearing the cured electroconductive coatings were tested, along with a respective non-coated control piece of nylon cloth, as described below.

In order to determine the initial antistatic properties due to the coating composition, a commercially available static voltmeter was used to measure the time required to dissipate ½ of a 100 volt charge applied for 60 seconds to the surface of a non-coated control piece of nylon and that of one of the coated pieces of nylon. The results in terms of ½ life time were greater than 500 seconds for the control and less than 1 second for the test sample.

In order to determine the wash-resistance properties, i.e. to evaluate the permanence characteristics of the antistatic coating, charge dissipation time measurements were made on each of the remaining three coated pieces of nylon cloth after they had been washed a varied number of times. One of the coated pieces of nylon cloth, along with a non-coated control, was repeatedly washed five times in a solution consisting of 1.5 grams of a commercially available laundry detergent in 1 liter of tap water. Another coated piece of nylon cloth, along with a non-coated control, was washed 10 times in a similar detergent solution, and the last coated piece of nylon cloth and its corresponding control were washed 15 times in a similar detergent solution. All washings were followed by a thorough rinsing with tap water. Upon testing the dried washed materials for their antistatic properties in the manner described above, it was observed that no change occurred in either case in all three sets. The ½ life measurements of the charges applied to the surfaces of the washed controls were greater than 500 seconds and those on the surface of the washed coated pieces of nylon were less than 1 second.

EXAMPLE XIV

This example illustrates the usefulness of a prepolymer having a half ester of a symmetrically substituted benzoin chemically bonded thereto in the preparation of an electroconductive coating composition. Said prepolymer comprised an ethylenically unsaturated epoxide, a cyclic anhydride, and a saturated epoxide as described hereinbelow. Said half ester of a symmetrically substituted benzoin, which served as the photoinitiator, was the half ester form of benzoin succinate prepared in the following manner:

Into a suitable flask which was mounted in an oil bath, shielded from light, and equipped with a gas inlet fixture, a mechanical stirrer, and a thermometer, there were charged 63.7 grams (0.3 moles) of benzoin and 30.0 grams (0.3 moles) of succinic anhydride. These two ingredients were then reacted under a nitrogen blanket at 130° C until the reaction was completed as indicated by infrared analysis. A quantity of the benzoin succinate half ester was then used with the other ingredients to make the prepolymer having the photoinitiator chemically bonded thereto as set forth below.

A suitable flask was shielded from light, mounted in a water bath, equipped with a condenser, a mechanical stirrer, and a thermometer. Into the flask were introduced the following ingredients:

| Ingredient | Amount in Grams |
|---|---|
| Benzoin succinate half ester | 93.7 (0.3 moles) |
| Glycidyl methacrylate | 170.4 (1.2 moles) |
| Succinic anhydride | 90.1 (0.9 moles) |
| p-Methoxyphenol | 0.36 |
| Benzyl trimethyl ammonium chloride | 1.8 |

The above described ingredients were continuously stirred and the temperature of the resulting mixture was raised to and maintained at about 70° C until the reaction was complete, as indicated by an acid number of 0.9. The thusly prepared composition was cooled to about 23° C and a portion thereof was mixed with ethenically unsaturated electroconductive salt and an ethylenically unsaturated diluent to make a photocurable electroconductive coating composition, in accordance with this invention, as set forth below.

To 20 parts of the above described benzoin succinate half ester there were added 60 parts of 2-hydroxyethyl acrylate and 20 parts of N,N-dimethyl-N,N-diallyl ammonium chloride. The resulting mixture was stirred into a homogeneous composition.

When a portion of the above described composition was coated onto a paper substrate, cured by exposure to ultraviolet light, and tested, using the methods set forth in Examples I and IV, it was observed that the coating and conductivity properties of this compositon were comparable to those in the preceding examples.

Summarizing, it is thus seen that this invention provides novel photocurable electroconductive coating compositions characterized by their ability to be rapidly cured by exposure to actinic radiation and to be readily overcoated with an aqueous dispersion of a photoconductive material. It is also seen that this invention provides photocurable electroconductive coating compositions which are water insoluble and are capable of being readily applied to a variety of substrates. When utilized in the prescribed manner in the preparation of electrostatic copying elements, the novel electroconductive coating compositions of this invention offer the additional advantages of the elimination of inflammable solvents in the electroconductive overcoatings and of the recovery equipment usually employed therewith. Furthermore, this invention provides novel actinic radiation curable electroconductive compositions which are useful as water-insoluble antistatic coating compositions.

It is understood that variations in proportions, procedures, and materials may be made without departing from the scope and spirit of this invention as defined by the following claims:

We claim:

1. An actinic radiation cross-linkable coating composition of matter consisting essentially of:
   (A) an acrylic monomer devoid of groups which inhibit free radical polymerization, having at least one terminal acrylate or substituted acrylate group,
   (B) a photoactivatable freee radical polymerization initiator selected from the group consisting of 3-hydroxy-2-butanone, phenanthrene-quinone, polyhalogenated aromatic anhydrides, ($C_1$–$C_4$) benzoin ethers and benzoins of the formula:

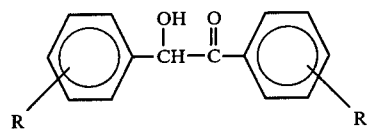

where R is a member of the group consisting of hydrogen, halogen and $C_1$–$C_{20}$ alkyl, said initiator being present as a separate species or in a chemical combination with said monomer, and
   (C) a copolymerizable monomer which is an organic compound having at least one terminal ethylenically unsaturated group and selected from the group consisting of salts of allyl substituted quaternary ammonium compounds and alkali metal salts of acrylic, methacrylic and vinylbenzene sulfonic acids, wherein at least one of said monomers in part A or part C contains more than one terminal ethylenically unsaturated group.

2. The composition of claim 1 wherein said part A comprises from about 50 percent to about 80 percent, by weight; said part B comprises from about 1.0 to about 10 percent, by weight; and said part C comprises from about 20 to about 50 percent, by weight, of said composition.

3. The composition of claim 1 wherein said part A is comprised of 25 parts, by weight, of low molecular weight polyester comprised of about 11 percent, by weight, of 2-hydroxyethyl acrylate, about 19 percent, by weight, of maleic anhydride, about 42 percent by weight, of glycidyl methacrylate, and about 28 percent, by weight, of tetrachlorophthalic anhydride; in combination with 10 parts, by weight, of 2-hydroxyethyl acrylate; said part B is tetrachlorophthalic anhydride and is chemically combined in the polyester of part A; and said part C is 15 parts, by weight, of N,N-dimethyl-N,N-diallyl ammonium chloride.

4. The electroconductive coating composition according to claim 1 wherein said part A is acrylic acid present in an amount ranging from about 50.0 to about 80.0 percent; said part B is n-butyl benzoin ether present in an amount ranging from about 1.0 to about 10.0 percent, by weight; and said part C is N,N,N-triallyl-N-methyl ammonium chloride present in an amount ranging from about 20.0 to about 40.0 percent, by weight.

5. The electroconductive coating composition of claim 1 wherein said part A is 2-hydroxyethyl acrylate present in an amount ranging from about 50.0 to about 80.0 percent, by weight; said part B is isobutyl benzoin ether present in an amount ranging from about 0.1 to about 10.0 percent, by weight; and said part C is N,N,N-triallyl-N-methyl ammonium chloride present in an amount ranging from about 10.0 to about 40.0 percent, by weight.

6. An electroconductive system comprising a substrate coated with the photocurable electroconductive coating composition of claim 1, crosslinked and insolubilized by actinic radiation.

7. The composition of claim 1 wherein said photoactivatable polymerization initiator of part B is in chemical combination with the monomer of Part A and is selected from the group consisting of the polyhalogenated anhydrides of dicarboxylic acids and the half esters of dicarboxylic acids with the symmetrically substituted benzoins of the formula:

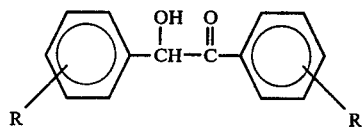

where R is selected from the group consisting of hydrogen, halogen or an alkyl group containing 1 to 20 carbon atoms.

8. The composition of claim 1 which is solvent-free.
9. The composition of claim 2 which is solvent-free.
10. The composition of claim 7 which is solvent-free.
11. The electroconductive system of claim 1 which is solvent-free.

* * * * *